United States Patent [19]

Ishii

[11] Patent Number: 4,974,198
[45] Date of Patent: Nov. 27, 1990

[54] VECTOR PROCESSING SYSTEM UTILIZING FIRM WARE CONTROL TO PREVENT DELAYS DURING PROCESSING OPERATIONS

[75] Inventor: Hideshi Ishii, Tokyo, Japan

[73] Assignee: NEC Corporation, Tokyo, Japan

[21] Appl. No.: 73,728

[22] Filed: Jul. 15, 1987

[30] Foreign Application Priority Data

Jul. 16, 1986 [JP] Japan .................. 61-168626
Feb. 26, 1987 [JP] Japan .................. 62-41326

[51] Int. Cl.⁵ .............................................. G06F 7/22
[52] U.S. Cl. .................................. 364/900; 364/736;
364/758; 364/937.2; 364/947.6; 364/931.51;
364/937.7; 364/937.4; 364/937.1
[58] Field of Search ... 364/200 MS File, 900 MS File,
364/754, 748, 758, 736

[56] References Cited

U.S. PATENT DOCUMENTS

| | | | |
|---|---|---|---|
| 3,304,417 | 2/1967 | Hertz | 364/748 |
| 4,287,566 | 9/1981 | Culler | 364/200 |
| 4,507,748 | 3/1985 | Cotton | 364/200 |
| 4,525,796 | 6/1985 | Omoda et al. | 364/200 |
| 4,541,046 | 9/1985 | Nagashima | 364/200 |
| 4,589,067 | 5/1986 | Porter et al. | 364/200 |
| 4,594,679 | 6/1986 | George et al. | 364/754 |
| 4,594,682 | 6/1986 | Drimak | 364/200 |
| 4,617,625 | 10/1986 | Nagashima et al. | 364/200 |
| 4,620,275 | 10/1986 | Wallach et al. | 364/200 |
| 4,639,886 | 1/1987 | Hashimoto | 364/200 |
| 4,665,479 | 5/1987 | Oinaga | 364/200 |
| 4,682,302 | 7/1987 | Williams | 364/768 |
| 4,706,191 | 11/1987 | Hamstra | 364/200 |
| 4,736,335 | 4/1988 | Barkan | 364/748 |
| 4,740,893 | 4/1988 | Bucholz et al. | 364/200 |
| 4,777,613 | 10/1988 | Shahan | 364/748 |
| 4,791,555 | 12/1988 | Garcia | 364/200 |
| 4,862,392 | 8/1989 | Steiner | 364/522 |

Primary Examiner—David Y. Eng
Assistant Examiner—Eric Coleman
Attorney, Agent, or Firm—Foley & Lardner, Schwartz, Jeffery, Schwaab, Mack, Blumenthal & Evans

[57] ABSTRACT

A vector processing system prevents delays in reading microinstructions from a control memory during processing operations. The vector processing system permits a second microinstruction to be read from the control memory before processing is completed on a first microinstruction. Thus, delays caused by waiting for the processing to be completed on the first microinstruction before loading the next microinstruction are prevented. The disclosed vector processing system incorporates a start command hold flag that holds the start command from a second microinstruction until the processing initiated by the first microinstruction is completed.

3 Claims, 11 Drawing Sheets

VECTOR PROCESSING SYSTEM UTILIZING FIRM WARE CONTROL TO PREVENT DELAYS DURING PROCESSING OPERATIONS

BACKGROUND OF THE INVENTION

The present invention relates to a vector processing system and, more particularly, to a vector processing system using firmware control.

Conventionally, processing systems equipped with vector processing instructions for executing the same processing on a large quantity of vector data, such as the one disclosed in U.S. Pat. No. 4,620,275, are used in many cases as means for faster scientific or technological calculation.

In so-called supercomputers, vector processing instructions are often executed with a specialized circuit for vector processing. Meanwhile, in systems in which performance requirements are not so stringent as on supercomputers, vector processing instructions are frequently executed by the common use of a processing unit for usual scalar processing with a view to restraining the expansion of hardware quantity.

A processing unit for use in scalar processing usually has no pipeline architecture. Therefore, as long as a vector element is being processed, processing of the next element cannot be started. In a vector processing system where the execution of the processing of each vector element is achieved under hardware control and the command to start the processing of each element is given under firmware control, the command to start processing a given element is issued after the processing of the preceding element has been judged to have been completed.

Meanwhile, the time taken to execute floating point processing in such a system often varies with whether or not normalization of the result of processing is required. For an example of such a system, reference may be made to U.S. Pat. No. 4,589,067.

Said judgement of the completion of previous processing in order to give a starting command under firmware control requires branch judgement, according to a completion signal fed from the processing circuit, as to whether or not the processing of the next element is to be started. Where a branch of firmware is to be executed, the process of receiving the completion signal, reading out a microinstruction from a control memory and executing it constitutes an important factor determining the machine clock. Therefore, in the conventional vector processing system described above, various control actions are done from the time the processing of one vector element is completed until the time that of the next is started, resulting in the disadvantage that time is wasted such as in the reading of the microinstruction from the control memory and a consequent delay in the execution of the microinstruction.

SUMMARY OF THE INVENTION

An object of the invention, therefore, is to provide a vector processing system designed to eliminate the above-mentioned diasdvantage.

According to one aspect of the invention, there is provided a vector processing system having a processing circuit responsive to a start command under firmware control for execution of the processing of one vector element. The system comprises:

start-command-hold flag keeping stage set in response to the start command during the execution of processing by the processing circuit;

processing-execution-start instructing stage responsive to the start command for instructing to start executing the processing of the corresponding vector element when the processing unit is not executing processing; and stage to instruct the processing-execution-start instructing stage to start executing the processing of the next vector element in response to the completion of the execution of processing while the start-command-hold flag keeping stage is set and at the same time to reset the start-command-hold flag keeping means.

Further according to another aspect of the invention, there is provided a vector processing apparatus including a multiplier circuit responsive to a multiplication start command from firmware for executing the multiplication of one vector element, and an adder circuit responsive to an addition start command from the firmware for executing addition to one vector element. The system further includes:

processing type indicating stage for indicating that the type of the vector processing is multiplication-addition; and processing linking stage to instruct the execution of addition by the adder circuit in response to a multiplication completion signal from the multiplier circuit when multiplication-addition is indicated by said processing type indicating stage.

BRIEF DESCRIPTION OF THE DRAWINGS

Other objects, features and advantages of the present invention will be made more apparent from the detailed description hereunder when taken in conjunction with the accompanying drawings, wherein.

In the drawings, the same reference numerals represent respectively the same structural elements.

DETAILED DESCRIPTION OF PREFERRED EMBODIMENTS

Figure 1:
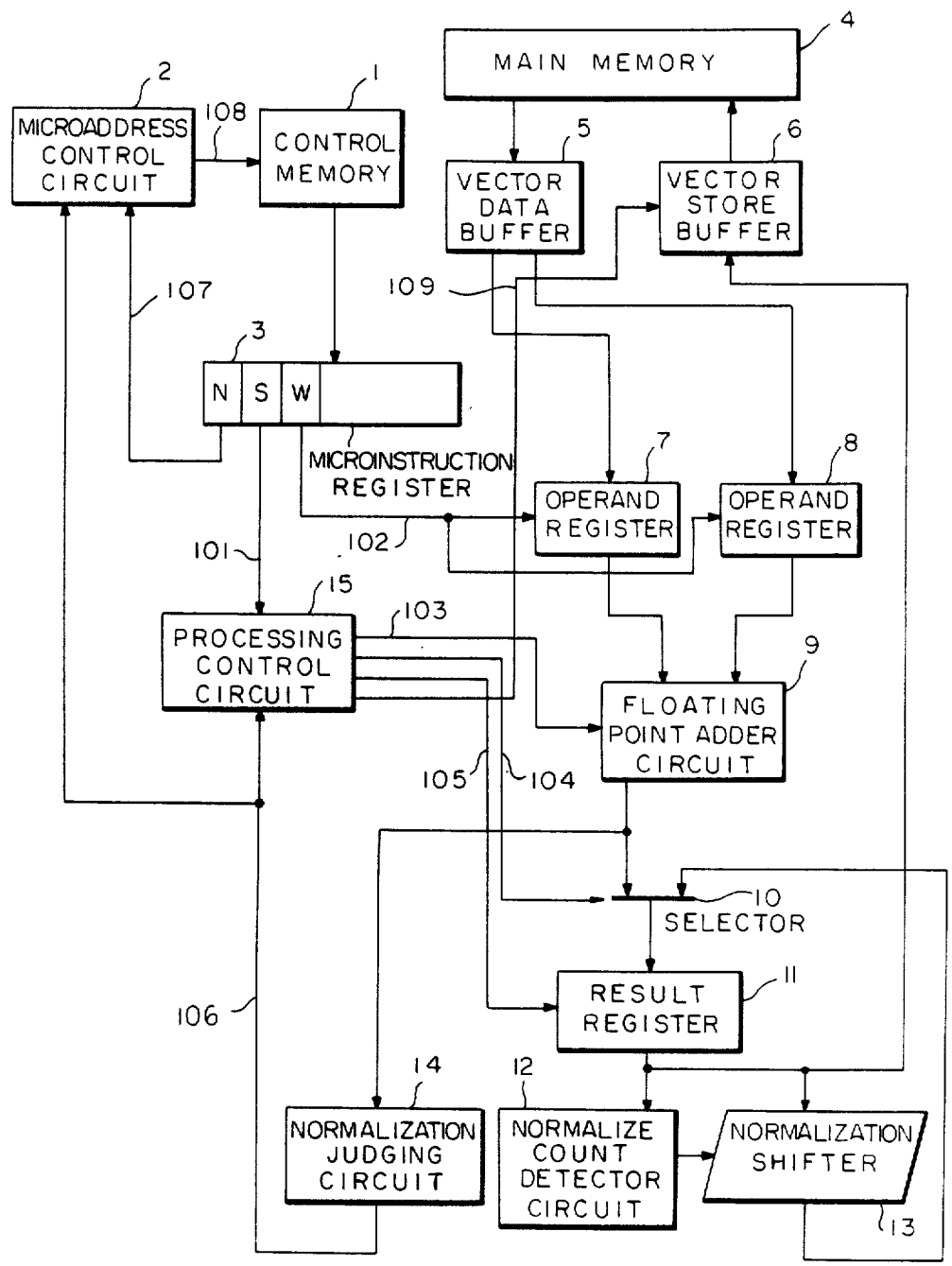
FIG. 1 is a diagram of a first preferred embodiment of the invention.

Referring to FIG. 1, a preferred embodiment of the present invention comprises a control memory 1 for storing a microprogram having a plurality of microinstructions for executing various instructions including vector processing instructions; a microaddress control circuit 2 for giving a read address to the control memory 1 by way of a line 108; a microinstruction register 3 for storing a microinstruction read out of the control memory 1 in response to the read address from the microaddress control circuit 2; a main memory 4 for storing vector data for use by vector processing instructions, other instruction operands and instructions; a vector data buffer 5 for temporarily storing vector data read out of the main memory 4; operand registers 7 and 8 for storing the vector data from the vector data buffer 5 in response to a command by a write bit (W) in the microinstruction of the microinstruction register 3; a floating point adder 9 for subjecting the vector data from the registers 7 and 8 to floating point addition or subtraction in accordance with a command given by way of a line 103; a selector 10 for selecting the result of processing from the floating point adder 9 in accordance with a selecting signal given by way of a line 104; a result register 11 for storing, in accordance with a signal given by way of a line 105, the result selected by the selector 10; a vector store buffer 6 responsive to a storing instruction given by way of a line 109 for storing the data set in the result register 11, if the data are already normalized, and feeding the data to the main memory 4; a normalization judging circuit 14 for judging whether or not the result of addition or subtraction from the floating point adder 9 is normalized; a normalize count detector 12 for detecting the shift count needed for normalization and supplying the shift count so detected; a normalization shifter 13 for shifting the data in the result register 11 by the shift count detected by the normalize count detector 12 and outputting the shifted data; and a processing control circuit 15 for controlling the floating point addition and subtraction.

The preferred embodiment of the invention will now be described in detail with reference to FIGS. 1 to 5.

Figure 5:
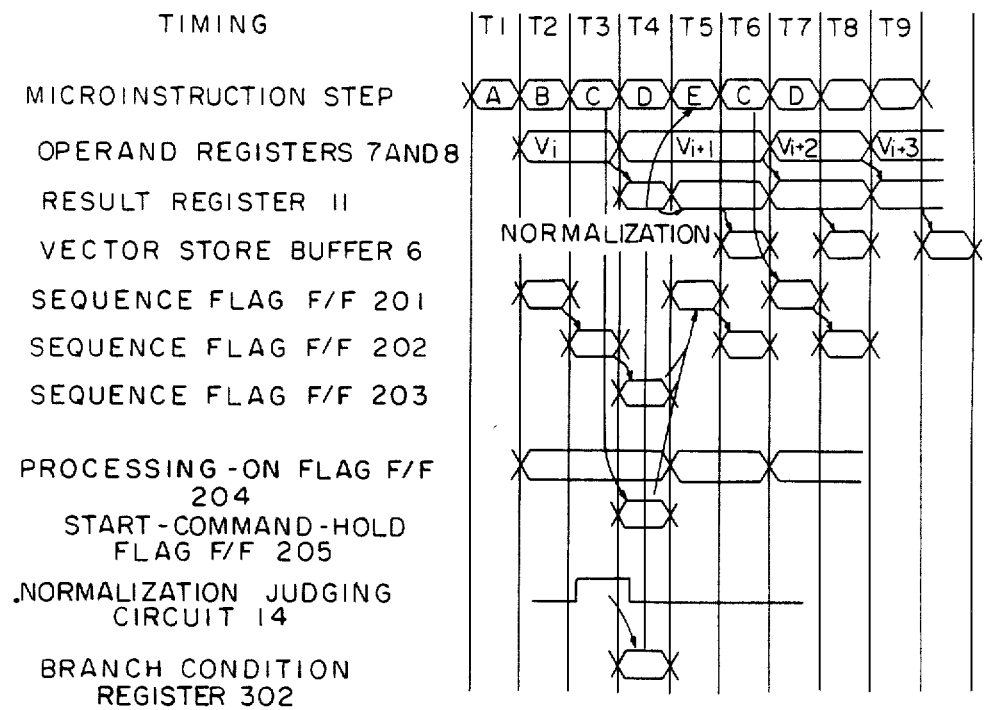
FIG. 5 is a timing chart of the vector processing operation of the first embodiment.

Referring to FIG. 5, microinstruction step A is first read out at timing T1.

Figures 4, 6:
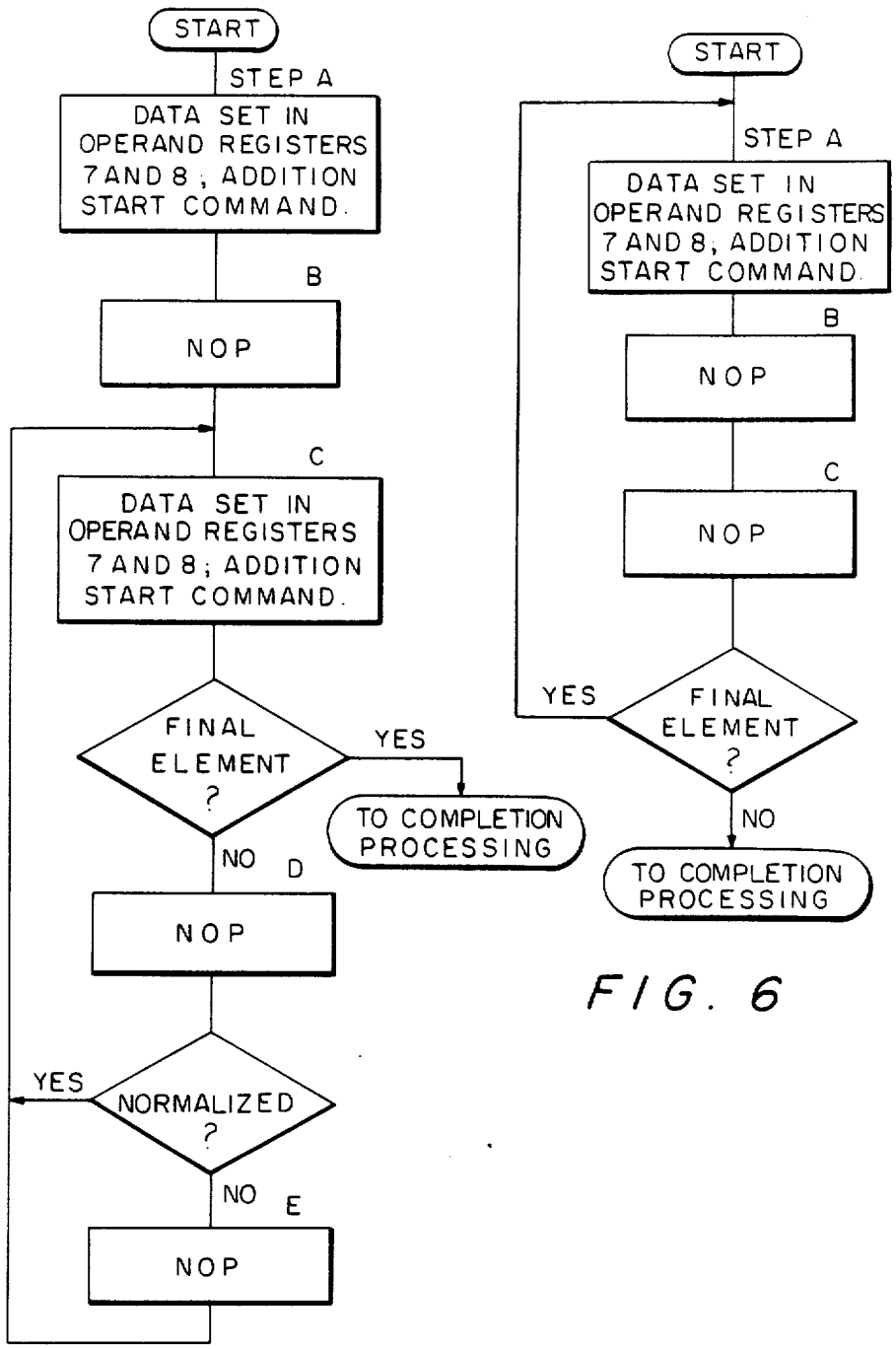
FIG. 4 is a diagram of the firmware operation of the first embodiment of the invention.
FIGS. 6 and 15 are diagrams of the firmware operation of the prior art.

With reference to FIG. 4, this step A is intended to set data in the operand registers 7 and 8 and to instruct the start of addition.

Figure 2:
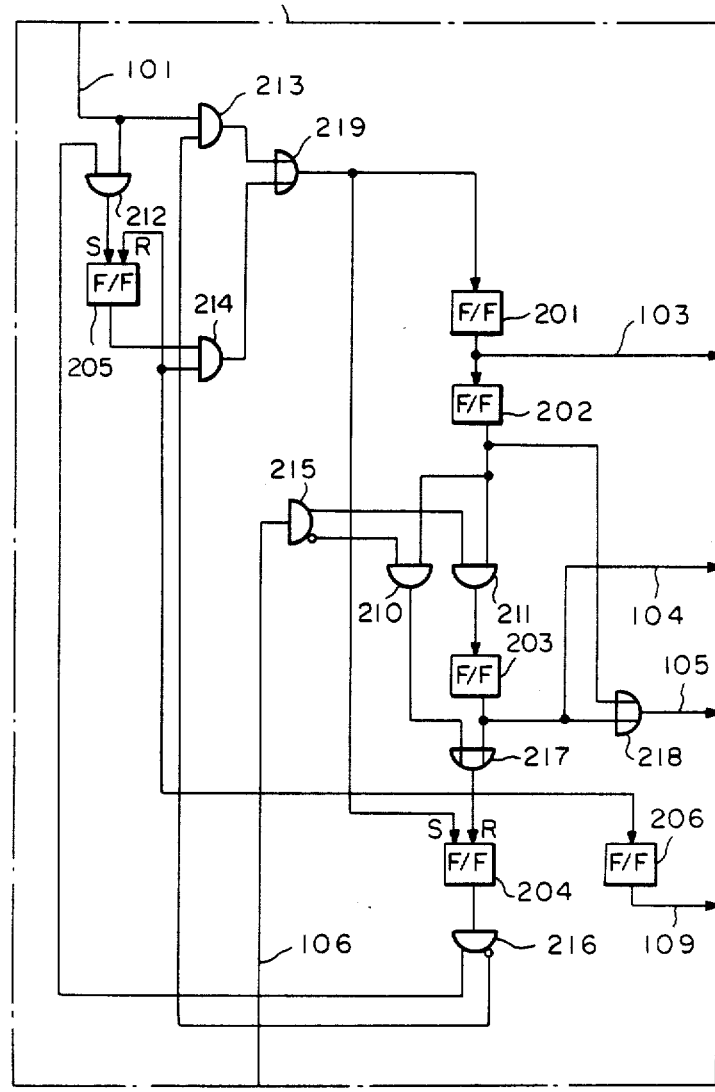
FIG. 2 is a diagram of the structure of a processing control circuit 15 shown in FIG. 1.

Referring again to FIG. 1, step A read out of the control memory 1 is stored in the register 3. At the next timing T2, the write bit (W) therein is given as store command signal to the operand registers 7 and 8 by way of a line 102. At the same time, a processing start bit (S) of the register 3 is fed to the processing control circuit 15 by way of a line 101. The processing start command signal given via the line 101 sets a sequence flag flip-flop (F/F) 201 by way of gates 213 and 219. In response to this setting, an addition control signal is given to the floating point adder circuit 9 of FIG. 1 via the line 103. Also upon the setting, a processing-on flag F/F 204 of FIG. 2 is set. This F/F 204 is set in response to the start, and reset in response to the completion, of processing execution. It is set when the completion of one processing and the start of the next processing simultaneously take place.

Referring once again to FIG. 1, the address of a next address field (N) in the register 3 of microinstruction step A is given to the microaddress control circuit 2 by way of a line 107.

Figure 3:
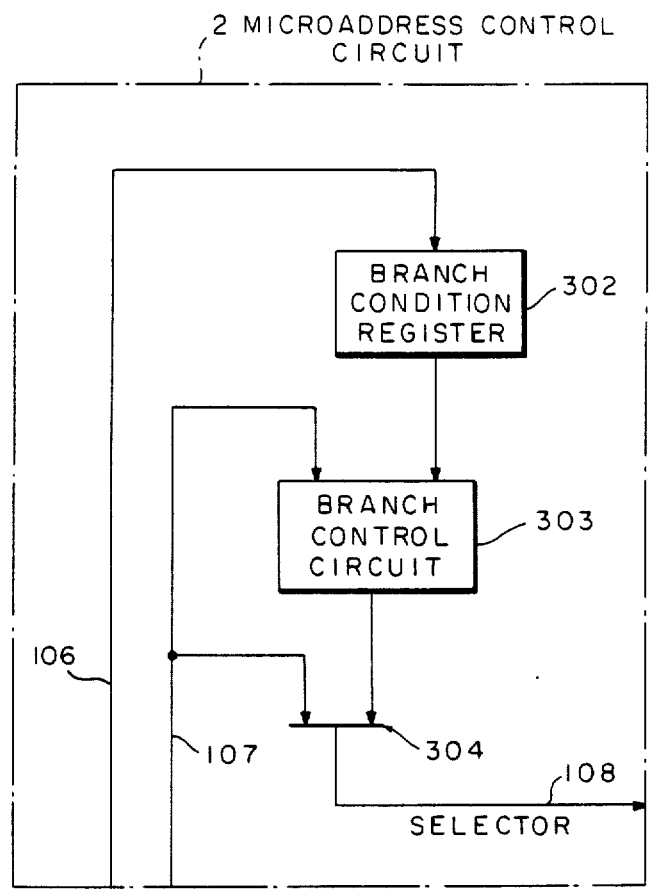
FIG. 3 is a diagram of the structure of a microaddress control circuit 2 shown in FIG. 1.

Referring now to FIG. 3, the address fed via the line 107 is sent out over the line 108 by way of a selector 304. At this address fed via the line 108 is read microinstruction step B, which is stored in the register 3.

At the next timing T3 is set a sequence flag F/F 202 shown in FIG. 2.

Referring to FIGS. 1, 4 and 5 together, microinstruction step C is read out of the control memory 1 at this timing T3, and set in the register 3. At this step C, data are set in the operand registers 7 and 8, processing is started and, at the same time, it is judged whether or not processing start command for all vector elements have been completed.

A signal provided via the line 101 at this step C is supplied to an AND gate 212. The other signal to the AND gate 212 is given from the F/F 204 by way of a gate 216. At the next timing T4, in response to these two signals, the signals of the AND gate 212 set a start-command-hold flag F/F 205. The F/F 205 is intended to hold, when a microinstruction to start the next processing is given during the execution of one processing, the instruction until the completion of the processing now under way. The F/F 205 is reset in response to the completion of the processing, or upon simultaneous occurrence of the completion of one processing and the start of the next processing. Referring to FIGS. 1 and 5, at timing T3, the result of addition by the floating point adder 9 is selected by the selector 10 and, at the same time, a signal that has been judged by the normalization judging circuit 14 to have not yet been normalized is output to a line 106.

The final judgment for this is given at timing T4 by the microaddress control circuit 2 at microinstruction step D on the basis of the signal on the line 106.

Referring now to FIG. 3, the signal provided via the line 106 is set in a branch condition register 302 as branch condition signal. The content of this register 302 is given to a branch control circuit 303, where is generated, by the use of an address signal supplied via the line 107 from the next address field (N) of microinstruction step D stored in the microinstruction register 3 of FIG. 1 at the time of conditional branch by a microinstruction and of the content of the branch condition register 302, the address of microinstruction step E to be executed next. In the case of conditional branch, the output of the branch control circuit 303 is supplied to the line 108 via the selector 304.

With reference to FIGS. 2 and 5, the signal which has been judged as yet unnormalized and is given via the line 106 is fed to an AND gate 211, and the output of the F/F 202 is set in an F/F 203 at timing T4.

Referring now to FIGS. 1 and 5, the operands stored in the operand registers 7 and 8 at timing T2 are added by the floating point adder 9, fed to the selector 10 at timing T3 and set in the result register 11 at timing T4. The store command in the result register 11 is given by the output of the F/F 202 of FIG. 2.

Referring again to FIGS. 1 and 5, microinstruction step E is read out of the control memory 1 at timing T5, and stored in the register 3.

At the same time, from timing T4 to timing T5, the shift count needed for normalization is detected by the normalize count detector 12 according to the content of the result register 11, stored via the selector 10.

Next, based on this shift count, the normalization shifter 13 shifts the content of the result register 11. The result of this shifting is stored in the result register 11 at timing T5 via the selector 10. This storing is instructed by the output of the F/F 203 of FIG. 2. This content of the result register 11 is stored in the vector store buffer 6 at timing T6.

Referring to FIGS. 2 and 5, because the F/Fs 203 and 205 were set at timing T4, the F/F 201 is set at timing T5 by way of an AND gate 214 and an OR gate 219. At the same timing T5 is also set anew the F/F 204.

Referring collectively to FIGS. 1, 4 and 5, next to microinstruction step E at timing T5, microinstruction step C is read out at timing T6. This microinstruction of step C is stored in the register 3, and the write bit (W) therein is provided to the operand registers 7 and 8 via the line 102, and new operands are stored at timing T7. From timing T4 to T6, the data stored in the operand registers 7 and 8 are added by the floating point adder 9, and stored in the result register 11 at timing T7 via the selector 10. As the instruction for this storing, the output of the flag F/F 202 is provided via the line 105 since the output of the adder 9 has been judged by the normalization judging circuit 14 to have been already normalized. If the output of the adder 9 is as yet unnormalized, the content of the F/F 201 is fed to the F/F 203 via the F/F 202. Or if the output of the adder 9 is already normalized, the content of the F/F 201 is provided to the F/F 202.

The content of the result register 22 stored at timing T7 is stored in the vector store buffer 6 at timing T8. Referring to FIG. 5, vector processing of three elements is executed in this example, where the time taken to execute processing of the first element is three clocks, increased by one clock owing to the normalization, and the processing of the second and third elements takes two clocks each.

In a conventional apparatus, when an instruction to start processing is outputted by firmware, the sequence flag F/F 201 would be immediately set and, in that case, the instruction to start the processing of the second element at timing T3 could not be given before firmware judges whether or not the processing of the first element has been completed. However, it is not until timing T5, i.e., step E, that firmware can confirm the completion of the processing of the first element, and this would be too late.

Figure 7:
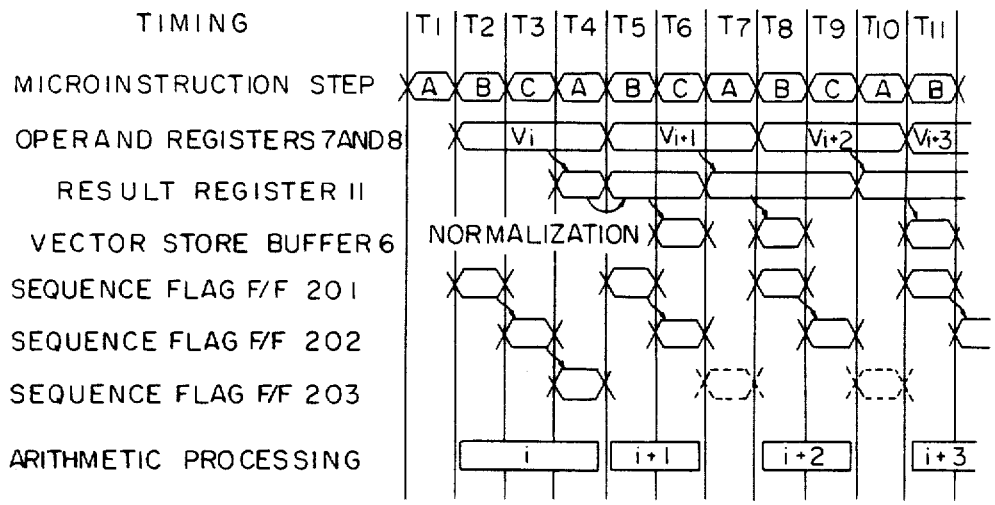
FIGS. 7 and 16 are time charts of the operation of the prior art.

Accordingly, for the conventional apparatus, the processing of every vector element had to be allowed three clocks in designing the firmware. In that instance, however, since elements needing no normalization, such as the (i+1)th and (i+2)th elements in FIG. 7, were also assigned three clocks for the execution of processing, there occurred idle times such as timings T7 and T10, resulting in deteriorated performance.

In this preferred embodiment of the present invention, by contrast, when an instruction to start processing is outputted from the firmware at timing T3, i.e. step C, the processing of the preceding element is yet to be completed. That is to say, as the flag 204 is at "1" during the execution of processing, the start-command-hold flag 204 is set to "1" and, after the instruction is held until the completion of the processing, the next element begins to be processed. Therefore, the firmware can always give the start instruction for the processing of the second or any subsequent element at step C, and it is sufficient to execute step E to achieve synchronization with the processing control circuit 15 only when the execution time is increased by one clock owing to normalization.

As hitherto described, the present invention provides the benefit of achieving high-speed execution of vector processing instructions under firmware control by absorbing delays due to firmware branch by the use of a start-instruction-hold flag.

Figure 8:
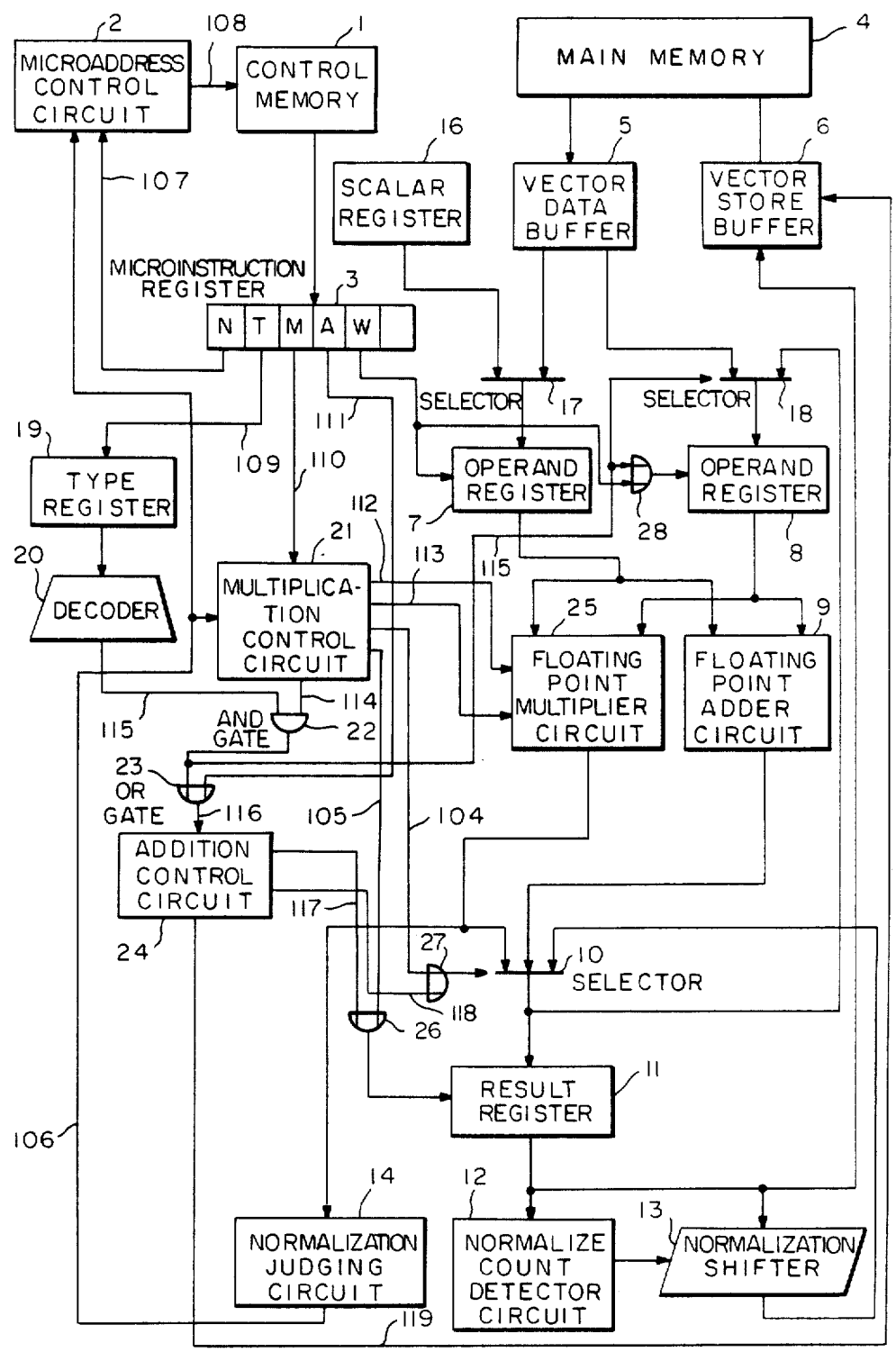
FIG. 8 is a diagram of a second preferred embodiment of the invention.

Referring now to FIG. 8, another preferred embodiment of the present invention is equipped with a control memory 1 for storing a microprogram comprising a plurality of microinstructions for executing various instructions including vector processing instructions; a microaddress control circuit 2 for giving a read address to the control memory 1 by way of a line 108; a microinstruction register 3 for storing a microinstruction read out of the control memory 1 in response to the read address from the microaddress control circuit 2; a main memory 4 for storing vector data for use by vector processing instructions, other instruction operands and instructions; a vector data buffer 5 for temporarily storing vector data read out of the main memory 4; a scalar register 16 for retaining scalar data for processing use; operand registers 7 and 8 for retaining, during execution of processing, operands for use in this processing; selectors 17 and 18 for selecting inputs to the operand registers 7 and 8, respectively; a floating point multiplier circuit 25 for subjecting the data from the operand registers 7 and 8 to floating point multiplication; a floating point adder circuit 9 for subjecting the data from the operand registers 7 and 8 to floating point addition; a result register 11 for storing the processing result data; a selector 10 for selecting input data to the result register 11; a normalization judging circuit 14 for judging whether or not the output of the floating point adder 25 is normalized (normal form); a normalize count detector 12 for detecting the shift count needed for normalization and supplying the shift count so detected; a normalization shifter 13 for shifting the data in the result register 11 by the shift count detected by the detector 12 and outputting the shifted data; a type register 19 in which is set a vector processing type code (T) given by a microinstruction stored in the microinstruction register 3; a decoder 20 for decoding the output of the type register 19 and outputting "1" on a signal line 115 when the vector processing type code indicates multiplication-addition; a multiplication control circuit 21 for controlling the processing executed by the floating point multiplier circuit 25; an addition control circuit 24 for controlling the processing executed by the floating point adder circuit 9; an AND gate 22; and OR gates 23, 26 and 27.

Now referring to FIGS. 3, 8 and 10, the operation of this vector processing apparatus will be described. Here is supposed to be executed the processing below, which is multiplication-addition:

$$V3_i \leftarrow V2_i + S \times V1_i$$

where $V1_i$, $V2_i$ and $V3_i$ represent the ith elements, respectively, of the three vector data stored in the main memory 4, and S represents a scalar datum stored in the scalar register 16.

As shown in FIG. 3, the microaddress control circuit 2 is equipped with a branch condition register 302, a branch control circuit 303 and a selector 304. If the normalization judging circuit 14 judges the output of the floating point multiplier circuit 25 not to be in a normal form, the circuit 14 will set the branch condition register 302 to "1" by way of a signal line 106. This branch control circuit 303 generates, according to address information supplied by way of a line 107 from the next address field (N) of the microinstruction register 3 at the time of conditional branch and to the content of the branch condition register 302, the address of the control memory 1 to be read next. The selector 304, when no conditional branch is to be effected, selects the signal line 107, with the result that the value of the next address field (N) of the microinstruction register 3 is used as it is as the address of the memory 1. When conditional branch is to be performed, the output of the branch control circuit 303 is selected.

Figure 13:
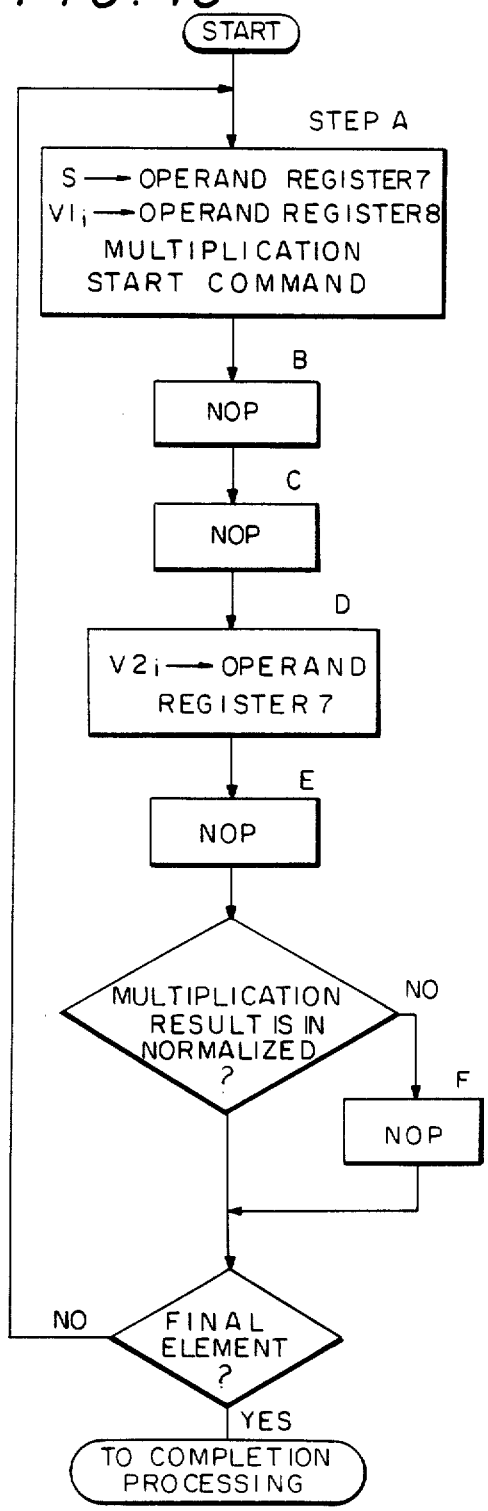
FIG. 13 is a diagram of the firmware operation of the second embodiment.
Figure 14:
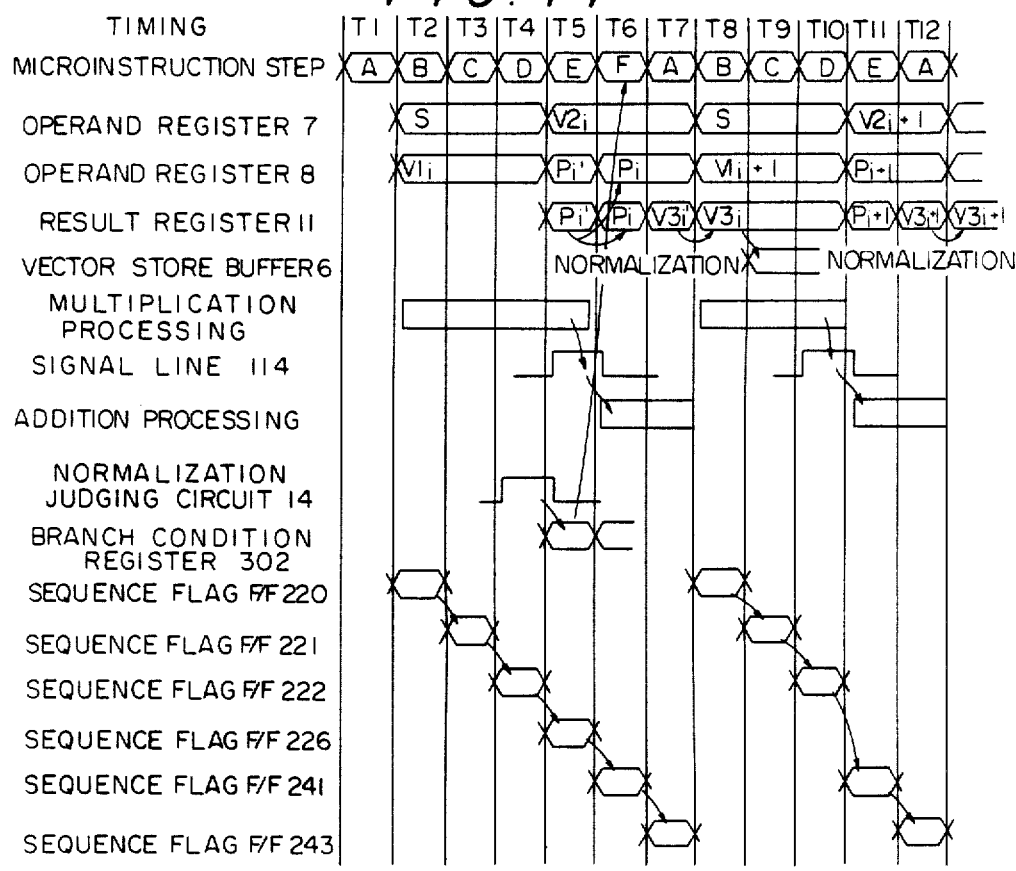
FIG. 14 is a diagram of the multiplication-addition processing of the second embodiment.

Now, FIG. 13 shows a flow chart of the firmware for a MULTIPLY AND ADD instruction, and FIG. 14, a timing chart of the execution of the MULTIPLY AND ADD instruction. Microinstruction steps (A to F) in FIG. 14 respectively correspond to steps A to F in the flow chart of FIG. 13.

Referring to FIGS. 8 and 13, the firmware performs control to st the content (S) of the scalar register 16 and the contents (V1$_i$ and V2$_i$) of the vector data buffer 5 in the operand registers 7 and 8, gives a command to start the execution of multiplication by the multiplication control circuit 21; and judges whether or not the result of multiplication is in a normalized form, and whether or not all the vector elements have been processed. Meanwhile, the execution of multiplication and addition, and the writing of results into the vector store buffer 6 are controlled by the hardware. Steps B, C, E and F shown in FIG. 13 are intended for coordination of timing with the hardware.

Referring now to FIGS. 13 and 14, the firmware for a MULTIPLY AND ADD instruction executes microinstruction step A at timing T1. At microinstruction step A, in response to the indication of the write bit (W) of a microinstruction in the microinstruction register 3, the content (S) of the scalar register 16 is set in the operand register 7, V1$_i$ is read out of the vector data buffer 5 and set in the operand register 8, and a command to start floating point multiplication is supplied to the multiplication control circuit 21.

Figure 9:
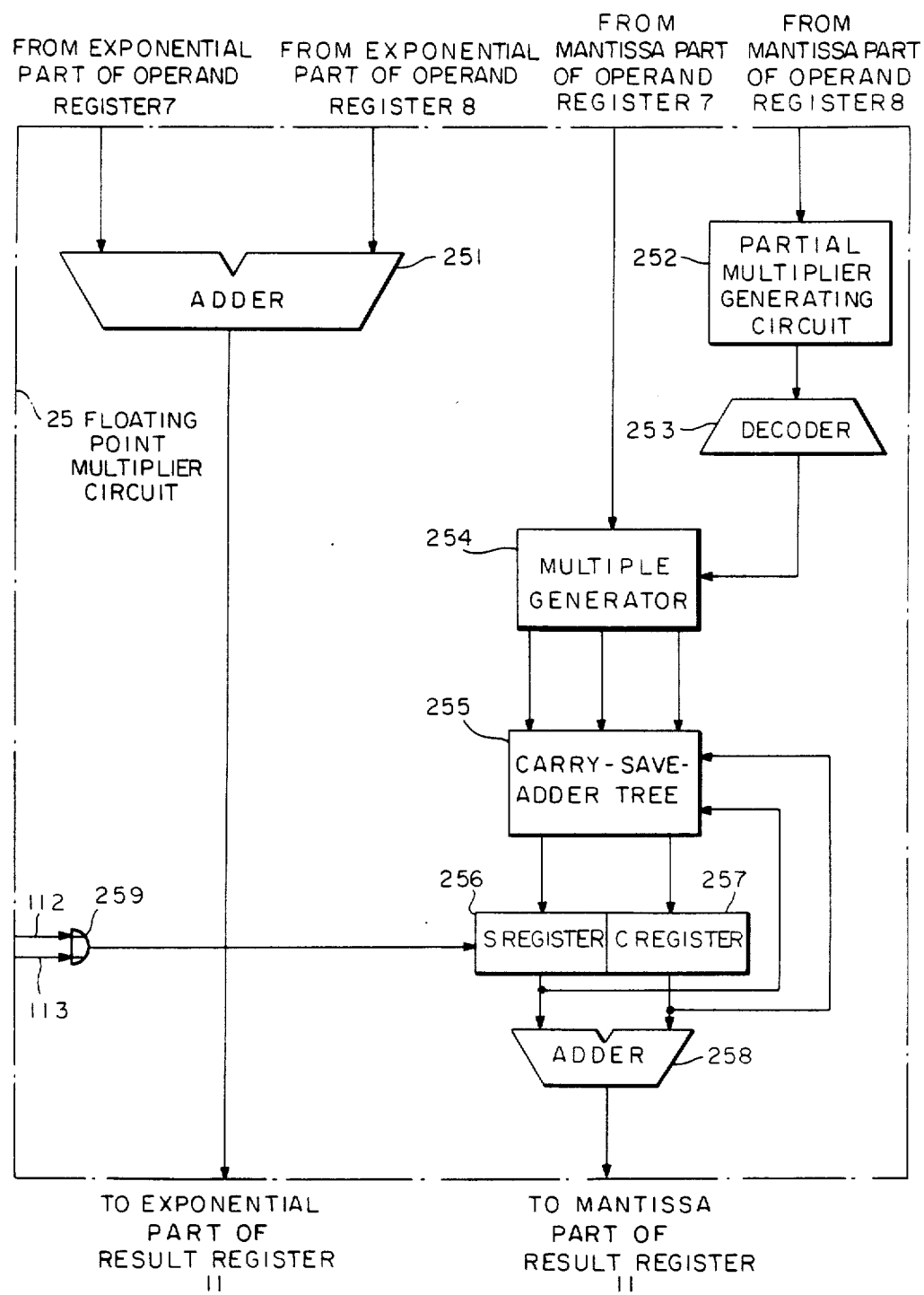
FIG. 9 is a diagram of the structure of a floating point multiplier circuit 25 of the second embodiment.
Figure 11:
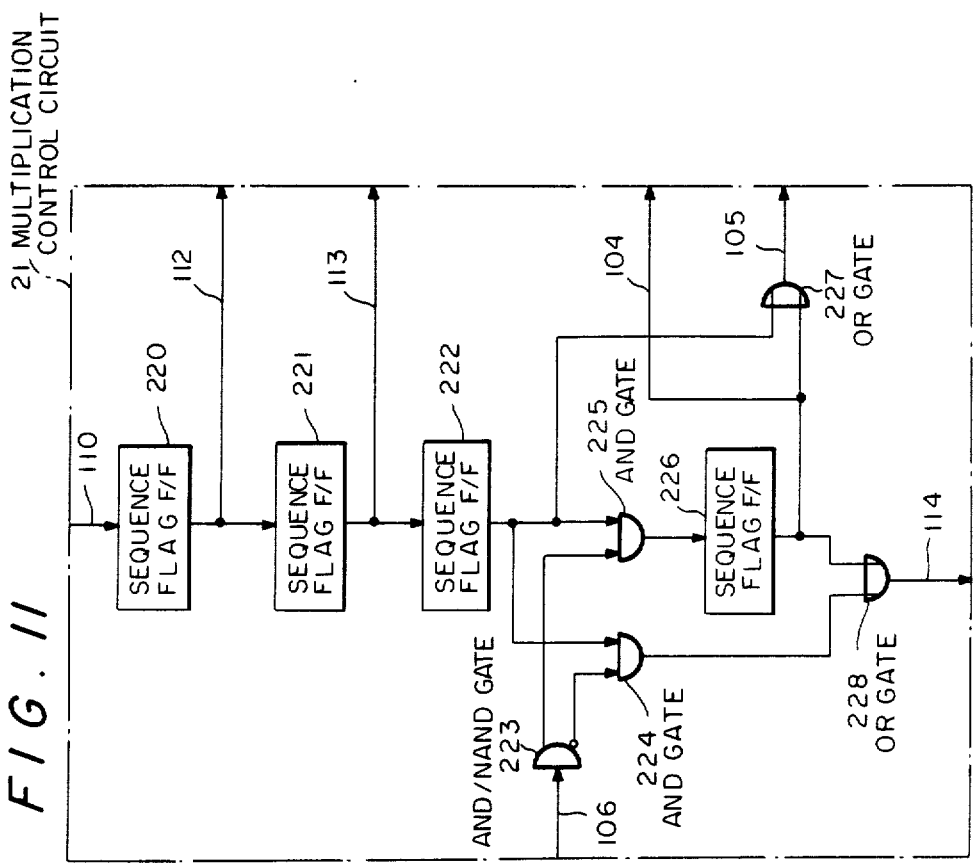
FIG. 11 is a diagram of the detailed structure of a multiplication control circuit 21 of the second embodiment.

With reference to FIGS. 8, 9 and 11, sequence flag F/Fs 220 and 221 are set in the multiplication control circuit 21 in response to a signal to instruct start of multiplication given from the M field of the microinstruction register 3 by way of a line 110. This setting causes the F/Fs 220 and 221 to give set commands to an S register 256 and a C register 257 by way of lines 112 and 113 and an OR circuit 259 of the floating point multiplier 25.

In the floating point multiplier 25, the exponential parts of the operands stored in the operand registers 7 and 8 are added by an adder 251, and fed to the exponential part of the result register 11. The mantissa part of the multiplier stored in the operand register 8 is divided into two partial multipliers by a partial multiplier generating circuit 252. The partial multipliers resulting from the division and the mantissa part of the multiplicand from the operand register are multiplied in two separate steps. A plurality of partial products are generated in accordance with Booth's method, and these partial products are added by a carry-save-adder-tree 255. Ultimately, divided into two data, sum and carry, they are stored in the S register 256 and the C register 257, respectively, at timing T3 in response to the aforementioned set command. The partial products stored in these registers 256 and 257 by the first partial multiplication are added to the partial products, resulting from the second multiplication by a multiple generator 254, by the carry-save-adder tree 255, and stored again in the registers 256 and 257 at timing T4. At the same timing, the content of the S register 256 and that of the C register 257 are added by an adder 258, and stored in the mantissa part of the result register 11 at timing T5.

Meanwhile in the multiplication control circuit 21, a sequence flag F/F 222 is set at timing T4 in response to a setting signal from the sequence flag F/F 221. The output of said F/F 222 is fed to the result register 11 at timing T5 by way of an OR gate 227, a line 105 and the OR gate 26.

Thus from timing T2 to T4, a floating point multiplications (S+V1$_i$) is executed by the floating point multiplier circuit 25, with the result that P$_i'$ is set in the result register 11 and the operand register 8 at timing T5. At timing T4, the normalization judging circuit 14 judges whether or not the multiplication result P$_i'$ is in a normalized form. If it is judged to be in a normalized form, the floating point multiplication is completed at timing T4 because P$_i'$ is a final multiplication result, and there is outputted a completion signal 106. If, on the contrary, the multiplication result P$_i'$ is judged not to be in a normalized form, normalization processing is performed at timing T5, and the final multiplication result P$_i$ is set in the result register 11 and the operand register 8 anew, the completion signal 106 being outputted at timing T5.

Referring now to FIGS. 8, 13 and 14, irrespective of whether the multiplication is completed at timing T4 or at timing T5, the firmware executes microinstruction step D at timing T4, and reads the vector data out of the vector data buffer 5 and V2$_i$ into the operand register 7. A MULTIPLY AND ADD instruction has a code indicating the type of processing, that is multiplication-addition type, stored in advance in the type register 19, and the type code indicating multiplication-addition is decoded by the decoder 20 to output logical "1" on the signal line 115. Therefore, upon outputting of a completion signal 114, a start command is given to the addition control circuit 24 via the AND gate 22, the OR gate 23 and a line 116.

Figure 12:
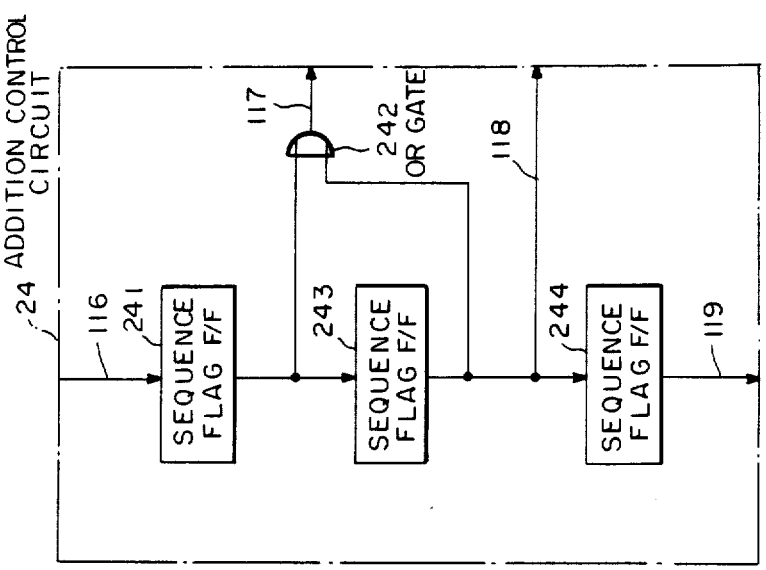
FIG. 12 is a diagram of the structure of a addition control circuit 24 of the second embodiment.

Referring next to FIGS. 8, 12 and 14, the signal provided via the OR gate 23 and the line 116 sets a sequence flag flip-flip (F/F) 241 at timing T6.

The floating point addition is processed over the duration of two clocks.

Figure 10:
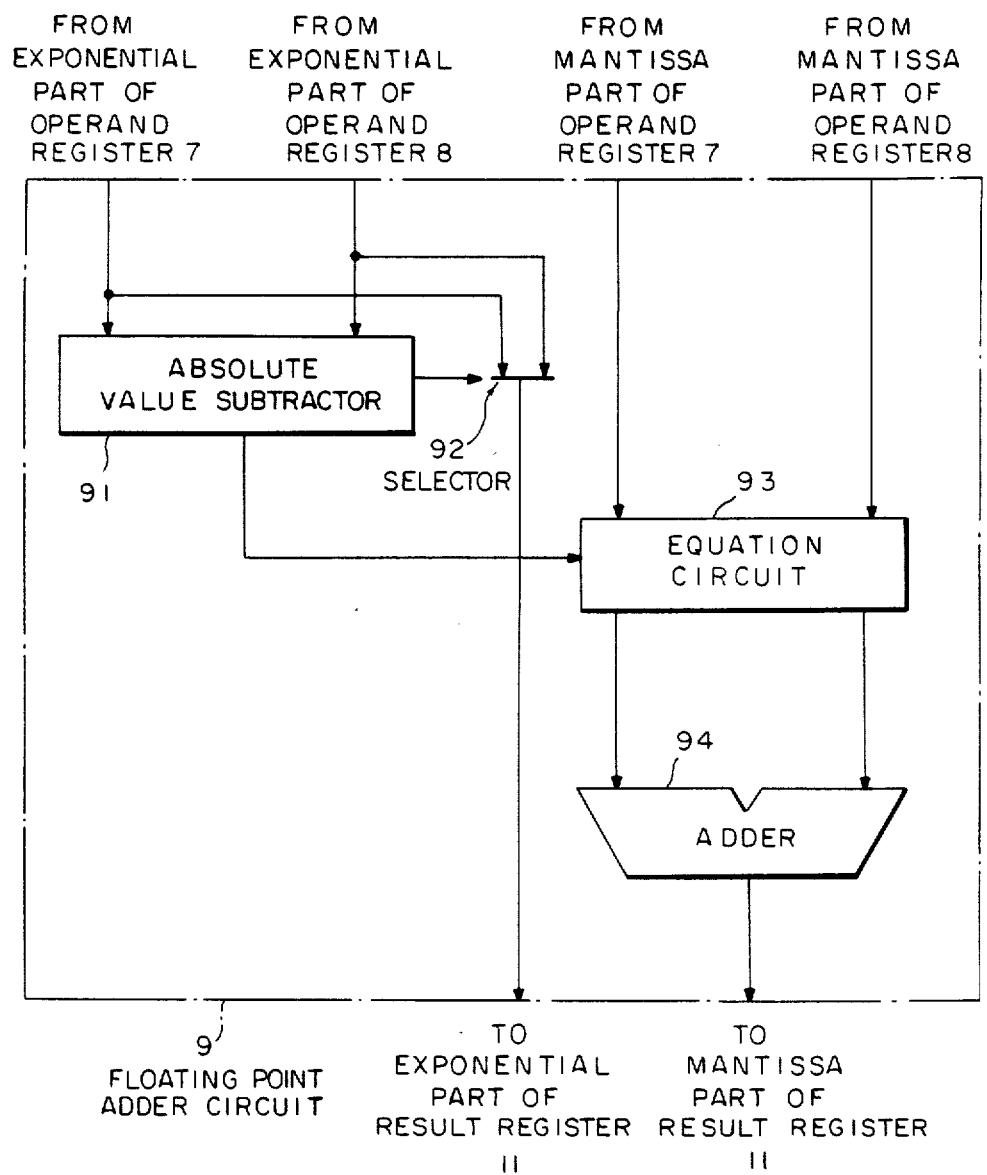
FIG. 10 is a diagram of the structure of a floating point adder 9 of the second embodiment.

Now referring to FIGS. 8 and 10, first at timing T6, the difference between the exponential parts of the operands stored in the operand registers 7 and 8 is obtained by an absolute value subtractor 91. The exponential part of the operand, judged to be greater by this subtraction, is selected by a selector 92, and fed to the exponential part of the result register 11. An equalization circuit 93 aligns the mantissa parts of the operand registers 7 and 8 according to the difference in exponential part revealed by the absolute value subtractor 91. After the alignment by the equalization circuit 93, they are added by an adder 94.

Referring again to FIGS. 8, 12 and 14, in the addition control circuit 24, the output of the sequence flag F/F 241 is given as set command signal to the result register 11 by way of an OR gate 242, a line 117 and the OR gate 26. In response to this set command signal, the result register 11 sets the result of addition.

At timing T7 is achieved normalization processing by the use of the normal count detector 12 and the normalization shifter 13 on the basis of the result stored in the result register 11.

Referring now to FIGS. 8, 11, 12 and 14, the selector 10 selects the output of the floating point multiplier circuit 25 in the initial state. Then, in response to the setting of a sequence flag flip-flop (F/F) 226 in the multiplication control circuit 21 at timing T5, a select command signal is given to the selector 10 by way of a line 104 and the OR gate 27. Responding to this select command signal, the selector 20 selects the output of the floating point adder circuit 9. In response to the setting of a sequence flat flip-flop (F/F) 243 in the addition control circuit 24 at timing T7, another select command signal is fed to the selector 10 by way of a line 118 and the OR gate 27. Responding to this select command signal, the selector 10 selects the output of the normalization shifter 13. This selection causes the normalized result to be set in the result register 11. At timing T8 is set a sequence flag F/F 244 in the addition control circuit 24, and a store instruction signal is supplied to the vector store buffer 6 by way of a line 119. In response to this store command signal, the vector store buffer 6 stores the normalized result from the result register 11.

Thus by the command to start addition, a floating point addition ($V2_i + P_i$) is executed from timing T6 to T7, and the addition result $V3_i$, after being set in the result register 11, is written into the vector store buffer 6 and, ultimately, into the main memory 4. Thus is completed the multiplication-addition processing of one element.

Referring now to FIGS. 8, 13 and 14, the firmware executes microinstruction step E at timing T5, and performs conditional branch in accordance with the content of a branch condition register 302. If, at this time, the value of the branch condition register 302, shown in FIG. 3, is "0" or in a normalized form, there will be a branch, after microinstruction step E, to microinstruction step A to start processing the next element. Or if the value of the branch condition register 302 at timing T5 is "1" or represents a non-normalized form, the time taken to execute the floating point multiplication will be longer by one clock on account of normalization. For this reason, there will be a branch to microinstruction step F to achieve time synchronization with processing under hardware control, followed by a further branch to microinstruction step A.

Whereas the above described operation will be repeated after timing T7, if the result of floating point multiplication is in a normalized form as shown with respect to timings T8 to T12, the execution time will be shorter by one clock than the processing at timings T2 to T7.

Figure 15:
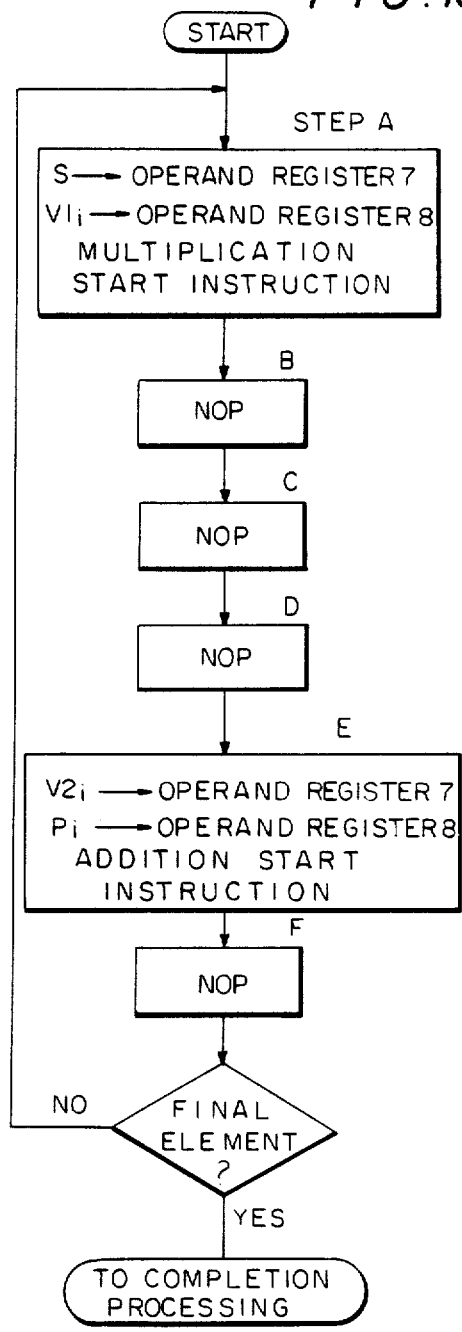
Figure 16:
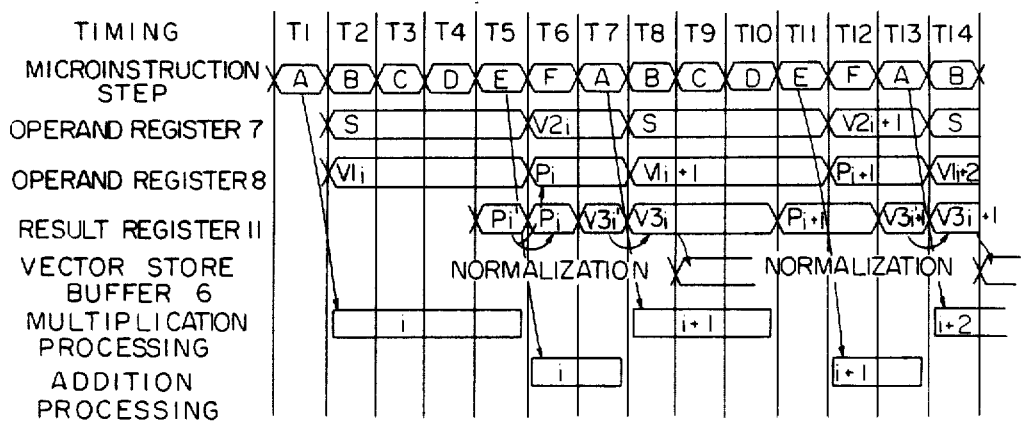

With reference to FIG. 15, a conventional apparatus requires the design of firmware allowing a total of six clocks for the processing of all the vector elements, comprising four clocks for multiplication and two for addition. Now referring to FIG. 16, since in that case four clocks of time is assigned for the multiplication of even an element needing no normalization, such as the (i+1)th multiplication result, there is an idle time as shown at timing T11, resulting in a corresponding deterioration in performance.

As hitherto described, the present invention has the benefit of absorbing the delay due to the branch of firmware by providing processing type indicating means for indicating that the processing is multiplication-addition and instructing the start of addition/subtraction immediately after the completion of multiplication, and thereby makes possible high-speed execution of vector multiplying-adding instructions under firmware control.

What is claimed is:

1. A vector processing system comprising:
an instruction control unit including a control memory that contains a plurality of microinstructions, a microaddress control circuit that generates a read address which is supplied to said control memory, and a microinstruction register that stores a microinstruction read out from said control memory in response to the read address generated by said microaddress control circuit;
a data memory unit coupled to said instruction control unit for storing vector and scalar data;
an arithmetic operations unit coupled to said data memory unit and including a plurality of operand registers that receive data from said data memory unit, a floating point multiplication circuit and a floating point addition circuit coupled to said plurality of operand registers, a selector that selects an output of said floating point multiplication circuit or said floating point addition circuit and supplies the selected output to a result register;
a normalization circuit coupled to said arithmetic operations unit and including a normalization judging circuit that judges whether the output of said floating point multiplication circuit is normalized, a normalize count detector coupled to the result register that detects a shift count needed for normalization, and a normalization shifter coupled to said result register and said normalize count detector that shifts the data received from the result register by the shift count detected by the normalize count detector;
a processing control circuit coupled to said arithmetic operations unit and including a type register in which a vector processing type code given by one of said microinstruction stored in said microinstruction register is set, a decoder for decoding an output of the type register and outputting a multiplication-addition signal when the vector processing type code indicates multiplication-addition, a multiplication control circuit for controlling processing executed by said floating point multiplication circuit and an addition control circuit for controlling processing executed by said floating point adder circuit, wherein said addition control circuit initiates addition by said floating point addition circuit upon receipt of a multiplication complete signal from said multiplication control circuit and said multiplication-adder signal from said decoder.

2. A vector processing system comprising:
a data memory unit;
an instruction control unit, said instruction control unit generating a store command signal and a processing start command signal;
a processing control unit coupled to said instruction control unit, said processing control unit generating an operations start command signal indicating at least two different arithmetic operations in response to said processing start command signal received from said instruction control unit;
an arithmetic operations unit coupled to a vector data storage unit, said instruction control unit and said processing control unit, said arithmetic operations unit loading vector data stored in said data memory unit in response to said store command signal received from said instruction control unit, performing said arithmetic operations on said vector data in response to said operations start command received from said processing control unit and performing a subsequent one of said arithmetic operations upon completion of a preceding one of said arithmetic operations; and a normalization unit coupled to said arithmetic operations unit that determines whether a result of said arithmetic operations performed by said arithmetic unit needs to be normalized and normalizes the result if necessary, said normalization unit generating a normalization signal indicative of a determination that normalization is necessary, which is provided to said processing control circuit, wherein said processing control unit in response to said normalization signal delays the generation of the operations start command signal unit normalization is completed by said normalization unit, wherein said processing control unit comprises an operations start command hold circuit and a processing-on circuit that receives said normalization signal and generates a clear signal, said operations start command hold circuit being set in response to said processing start command signal and delaying the generation of said operations start command signal until said clear signal is received from said processing-on circuit.

3. A vector processing system comprising:

a data memory unit;

an instruction control unit, said instruction control unit generating a store command signal and a processing start command signal;

a processing control unit coupled to said instruction control unit, said processing control unit generating an operations start command signal indicating at least two different arithmetic operations in response to said processing start command signal received from said instruction control unit;

an arithmetic operations unit coupled to a vector data storage unit, said instruction control unit and said processing control unit, said arithmetic operations unit loading vector data stored in said data memory unit in response to said store command signal received from said instruction control unit, performing said arithmetic operations on said vector data in response to said operations start command received from said processing control unit and performing a subsequent one of said arithmetic operations upon completion of a preceding one of said arithmetic operations; and a normalization unit coupled to said arithmetic operations unit that determines whether a result of said arithmetic operations performed by said arithmetic unit needs to be normalized and normalizes the result if necessary, said normalization unit generating a normalization signal indicative of a determination that normalization is necessary, which is provided to said processing control circuit, wherein said processing control unit in response to said normalizations signal delays the generation of the operations start command signal until normalization is completed by said normalization unit, wherein said normalization unit comprises a normalization judging circuit that generates said normalization signal, a result register that receives the result of the arithmetic operations performed by said arithmetic operations unit, a normalize count detector coupled to said result register that detects a shift count needed for normalization, and a normalization shifter coupled to said result register and said normalize count detector and shifts data received from the result register by said shift count received from said normalize count detector.

* * * * *